May 31, 1949.　　　　W. L. HUNT　　　　2,471,873
TIMER

Filed Dec. 26, 1944　　　　　　　　　　3 Sheets-Sheet 1

INVENTOR
WALTER LESLIE HUNT
BY HIS ATTORNEYS

INVENTOR
WALTER LESLIE HUNT
BY HIS ATTORNEYS

May 31, 1949.         W. L. HUNT            2,471,873
                         TIMER
Filed Dec. 26, 1944                      3 Sheets-Sheet 3
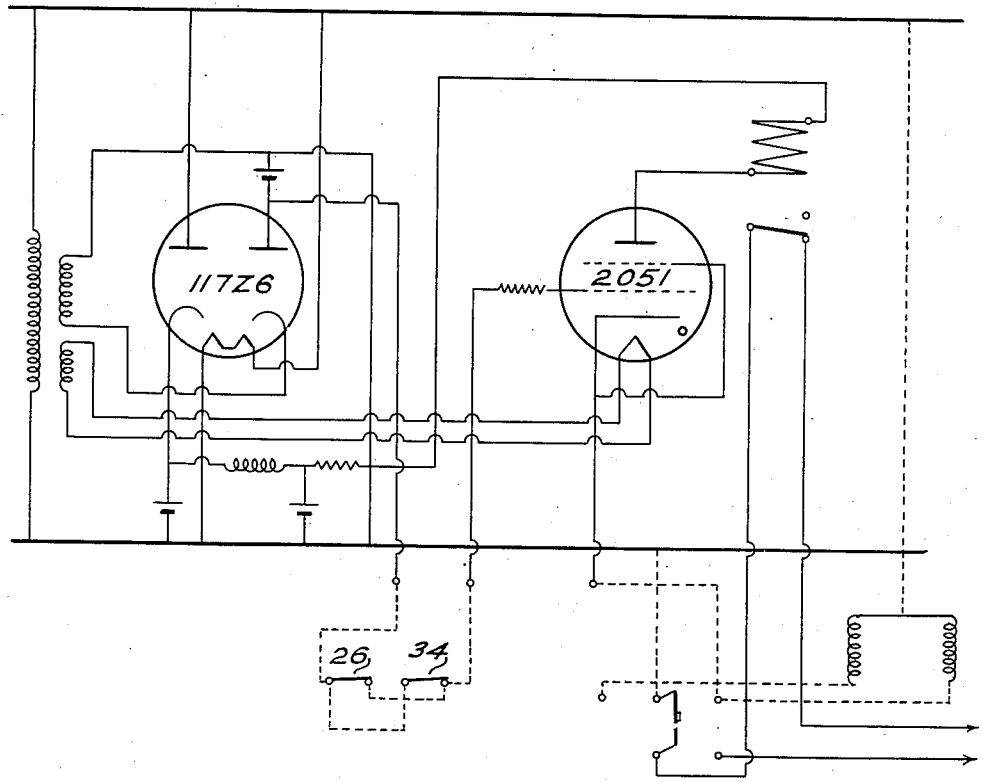
Fig. 5.
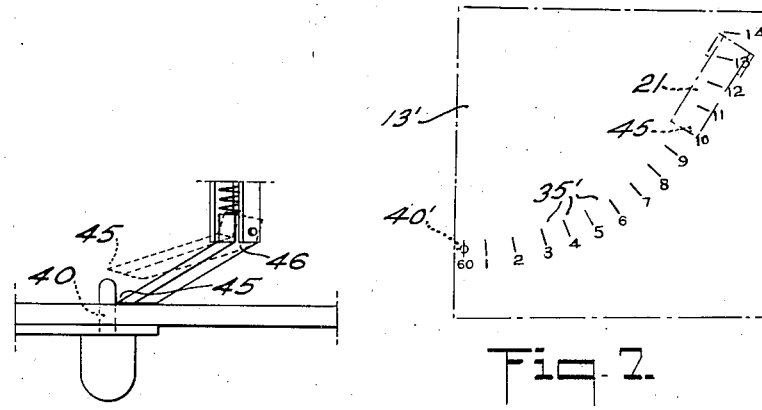
Fig. 6.                  Fig. 7.
INVENTOR
WALTER LESLIE HUNT
BY HIS ATTORNEYS Patented May 31, 1949

2,471,873

UNITED STATES PATENT OFFICE 2,471,873

TIMER

Walter Leslie Hunt, Philadelphia, Pa., assignor to Automatic Temperature Control Co., Inc., Philadelphia, Pa., a corporation of Pennsylvania Application December 26, 1944, Serial No. 569,755

5 Claims. (Cl. 161—1)

This invention relates to timers, and pertains particularly to timing devices by which timed intervals of extremely minute subdivisions of time can be secured.

The primary object is to provide a timer and timer system of simplicity, range, and accuracy, by which any given total time unit for which the instrument is set can be almost infinitely subdivided, and the output of the accurate timing in minute subdivisions can be recorded or utilized by electrical means. Other objects include the attainment of a great number of small intervals of time with a very small number of calibrations on the setting means; to obtain positive settings free from errors and independent of the human factor in predetermining the selected setting; to provide an instrument by which upon initiation after setting, a circuit will be closed for a preset duration, and, if desired, will automatically reset to its starting point; to provide a re-setting type of timer which will reset to its starting point in no more than one-sixtieth of its total range, in one illustrative form of instrument; to provide a timer of the foregoing attributes which is accurate and constant regardless of reasonable changes in incident temperatures, humidity, pressure, atmospheric changes and with voltage fluctuations of as much as ±20%; and to provide an instrument which, illustratively only, can divide a time cycle into 3600 timed intervals with a maximum number of points of angular adjustment of only 121. Other objects of the invention will become more apparent as the description proceeds.

In carrying out the invention in its simplest essence, two gears are provided for interrelated relative rotation as, for instance, by meshing engagement with an intermediate gear, the number of teeth of one gear being predeterminedly one single tooth more than the number of teeth of the other gear, so that one complete rotation of the one gear of a smaller number of teeth will mark an advance of the other gear a total distance of one tooth less than one complete revolution, at the completion of which, the two gears will be relatively displaced by one single tooth, despite the complete rotation of one gear.

In the accompanying drawings forming part of this description,

Fig. 5 represents a schematic wiring diagram of the electronic holding in relay associated with the system of the preceding figures;

Fig. 6 represents more clearly the uni-directional stop arrangement shown in part in Figs. 1 and 2;

Fig. 7 represents a fragmentary elevation of a modified form of front panel by which time can be measured.

Figure 1:
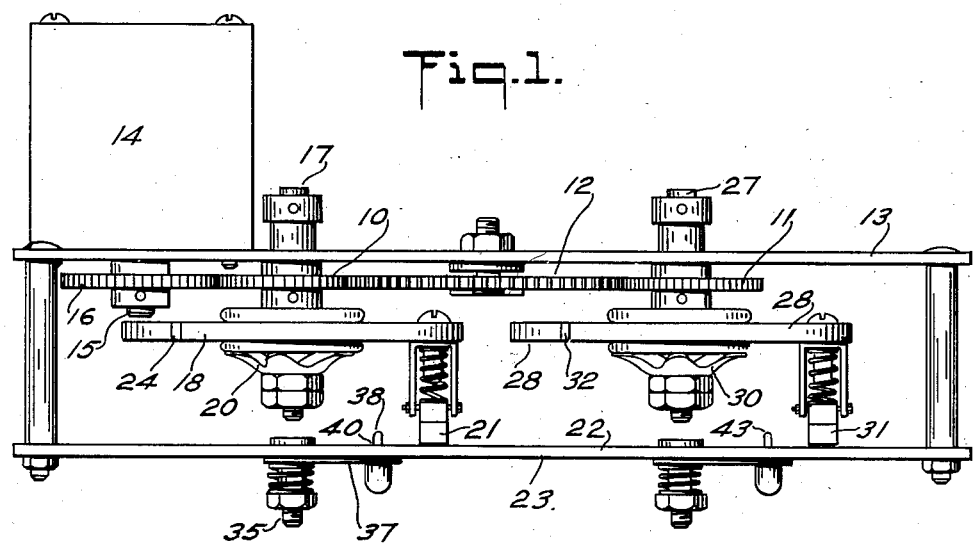
Fig. 1 represents a horizontal sectional through an illustrative form of the invention taken below the snap switches controlled by the cams coupled to the respective gears.

As noted, the essence of the invention as developed herein is a gear 10 having a predetermined number of teeth, say, for a purely illustrative disclosure, sixty teeth, although if desired it may be made large enough to have, say, one thousand teeth (for example) if the necessities of the installation require a time interval of one one-millionth of the total time for which the complete cycle of the instrument is set, as will be developed later herein. The illustratively sixty-toothed gear 10 has a tooth complemental gear 11 having one tooth more than the number of teeth on the gear 10. Illustratively, if gear 10 has sixty teeth, gear 11 will have sixty-one teeth. If, on the other hand, gear 10 has one thousand teeth, then gear 11 will have one thousand and one teeth and so it will go. The gears 10 and 11 are in constant mesh with an intermediate idler gear or train of idler gears 12 or the like.

As so far described, it will be understood that from any starting position with gears 10 and 11 in one predetermined relative angular relation, with a single selected tooth on gear 10 effectively engaging or being juxtaposed to a single selected tooth on gear 11, or with the single selected tooth on each gear occupying an identical predetermined angular relation to a zero or median angular setting, it will be clear that while gear 10 makes one complete revolution, gear 11 angularly makes one complete revolution less 1/61st of a revolution, or, illustratively, with a one-tooth lag or displacement approximating 5.9017°. Therefore, at the end of the complete revolution of gear 10, when its predetermined selected tooth returns to the initial predetermined angular position for effective engagement of or juxtaposition to said initially predetermined and selected tooth on gear 11, or to its predetermined angular relation to the median or zero setting, gear 11, having made one tooth less than a complete revolution, will be found with its said selected predetermined tooth no longer effectively engaging the selected tooth on gear 10, as it is now retarded one tooth or 5.90+° so that the said selected teeth are no longer in effective engagement. It will, therefore, be clear that if any member were associated in predetermined angular disposition to a selected tooth on gear 10, such as the switch-actuating stud to be described, and this was in predetermined relation to the median zero setting, as by being in effective engagement with a selected tooth on gear 11, and if the latter were also represented by an associated member such as the stud engaging the switch to be described, then upon one complete rotation of gear 10 from a position in which its associated stud actuates a switch, to a 360° rotation to reengage and actuate the switch, would find that the switch and stud associated with gear 11 would be out of contact, and the switch deenergized. This, of course, is by reason of the fact that the gear 11 will only have progressed one tooth less than a complete revolution. There still remains, in angular motion, 360°/61 of motion for gear 11 before its associated stud and switch are actuated to close the circuit through the switch. In other words, gear 10 must make sixty-one complete revolutions before the coupled gear 11 will have made sixty revolutions, to the end that once again, and for the first time since the gears have started to run from the initial predetermined setting, the relative angular relations of the gears is such that the same initially predetermined teeth on gears 10 and 11 are reestablished in effective contact or in identical angular relation to the zero or median setting. Conversely, of course, it will be seen that with gear 11 so disposed that its selected predetermined tooth is out of angular position for effective engagement with the said selected tooth on gear 10, in retarded relation thereto by an angular distance of one tooth, for purely illustrative instance only, or in degrees 360°/61, it will obviously require one complete rotation of gear 10 to cause the selected teeth on gears 10 and 11 again to effectively engage.

It is this gear relationship that represents the essence of the present invention, although the specific mode of utilization and the various forms the practical utilization may take, may vary widely without departing from the broad scope of the invention. On the other hand, the simplified method and apparatus which follow are important and represent one perfectly effective way of utilizing the invention for securing minute and accurate divisions of timed intervals.

The invention as set forth in the following description relies upon setting the instrument in such way that the timed interval starts with the gears in such relative angular displacements off from zero that an electric controlling circuit associated therewith is made and held only after such preselected time of running has elapsed as to cause the gears in their simultaneous, nearly but not quite analogous, running, with slow relative displacements, to return toward the initial starting or zero position in which one selected tooth, or an associated part of one gear occupies an angular position identical with that of the other selected tooth or associated part of the other gear to simultaneously close the operating or controlling circuit with the active elements associated with both gears.

Figure 2:
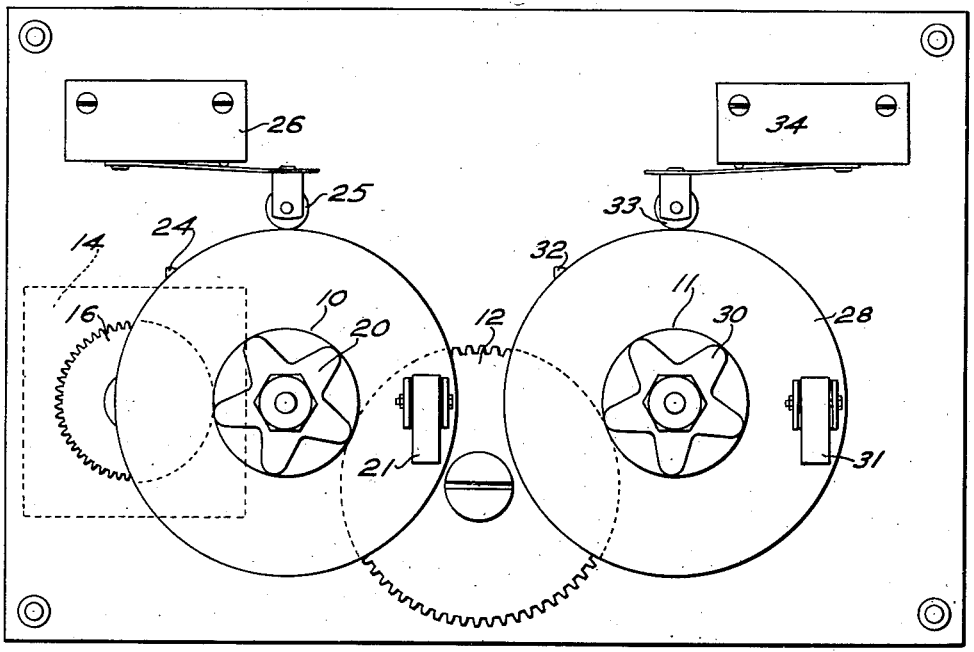
Fig. 2 represents a vertical section through the illustrative form of the invention of Fig. 1, taken just inside of the front panel of the instrument shown in Fig. 1.
Figure 3:
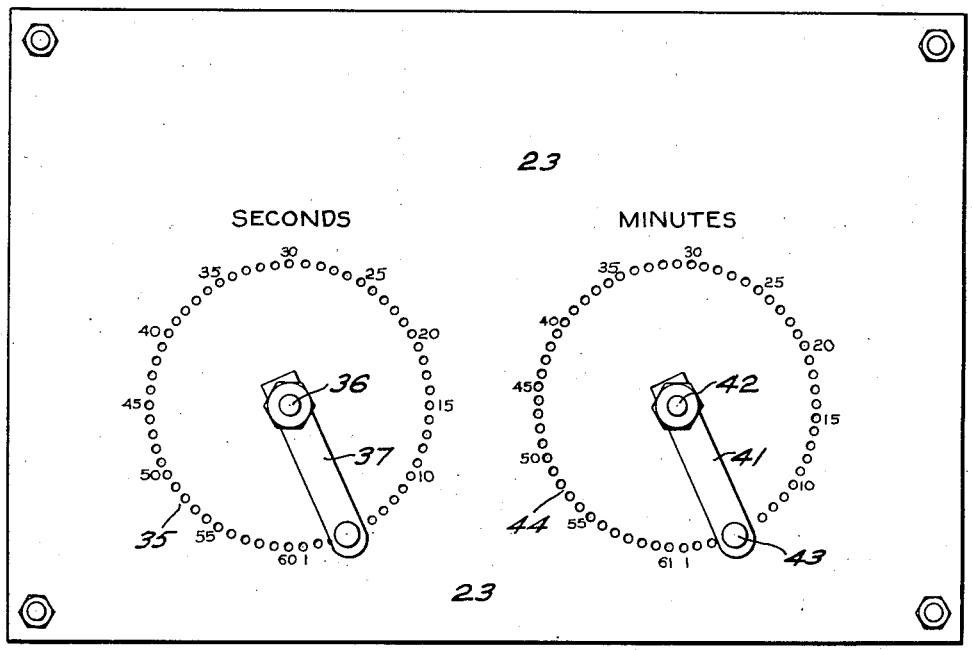
Fig. 3 represents a front elevation of the purely illustrative form of invention of Fig. 1, showing the variable setting for the control mechanism both in seconds and minutes, in a purely illustrative and arbitary selection of extremely minute time intervals derivable from the illustrative form of the invention.

In the disclosures of Figs. 1, 2 and 3, one illustrative embodiment of the invention in an instrument is secured. The rear panel 13 carries the self-starting induction motor 14, of the reversible type, which through suitable self-contained gear-reduction means drives a shaft 15 upon which a driving gear 16 is keyed, in permanent mesh with gear 10. Motor gear 16 is preferably provided with sixty teeth and is timed to make one complete revolution of gear 16 in one minute. It will thus be seen that gear 10 is advanced one tooth per second in the illustrative timed relation of the parts.

For merely "counting" purposes, if desired, motor 14 may comprise or may be replaced by a step-by-step or ratchet motor, arranged to advance gear 10 one tooth for each separate energization of the operating coil thereof. Thus, with suitable calibration of parts, numbers of impulses will be recorded by the device illustrated.

A shaft 17 is provided journalled suitably in the rear panel, upon which gear 10 is rotatable. On this same shaft 17 is journalled a cam track disc 18 coupled to the gear by a friction device 20 so that the cam or cam track 18 is driven with the gear 10 in either direction, but can be held against rotation, as during resetting of the instrument. A spring-pressed pivoted shoe 21 is mounted on the side of the cam 18 opposite to that of the gear 10, in position to engage against the inner surface 22 of the front panel 23 of the instrument. In known predetermined angular relation to the slidable pivoted shoe 21, a small lug or stud 24 is mounted extending radially of the cam in position to snap-actuate the roller 25 of the rear wall-mounted snap switch 26. It will be understood that there is only one angular position of the cam 18 in which the stud 24 engages the roller 25 and closes the circuit through the switch 26. This is because the stud 24 is angularly or peripherally not greater than one tooth on the gear 10, being preferably smaller than one tooth.

Similarly, to the foregoing, a shaft 27 is journalled suitably on the rear wall 13, and the gear 11 is rotatably mounted thereon. A cam disc or track device 28 is also journalled on the shaft 27 and is engaged by the friction device 30 to turn with the gear 11 in either direction but this also can be held against rotation with said gear in resetting the instrument. A pivoted spring-pressed shoe 31 is mounted on the cam 28 in position to wipe the inner surface 22 of the front panel 23. A switch-actuating stud 32 is disposed radially of the cam 28 on the surface thereof in predetermined known angular relation to the pivoted shoe thereon, in position to engage the roller 33 of the snap switch 34. Again the stud 32 is narrow and preferably smaller than any tooth on the gear 11. In the parts so far described it will be obvious that there is only one position of gear 10 and one related position of gear 11, angularly on their respective axes, at which the respective studs 24 and 32 will each have engaged the rollers 25 and 33 to simultaneously actuate both of the switches 26 and 34.

The front panel 23 of the instrument, against the rear face of which the respective wiping spring-pressed shoes 21 and 31 have sliding or wiping engagement, is provided with an annular series of apertures 35 concentric with an axis 36 upon which the spring-pressed arm 37 is pivotal or swingable, with a pin 38 toward the free end thereof arranged to enter selectively an appropriate aperture 40 of the series 35 to establish one of the time fixing points in the system. It is to be understood that the given selected point 40 will be, illustratively only, at point numbered 4 in the series of numbered apertures from 1 to 60 of the seconds graduations of the panel 23. It will be apparent that, considering the gear 10 only, and with the spring-pressed stop moved angularly with the gear until stopped by impingement of the pin at point 40 indicative of four seconds, the stud 24 on the periphery of the cam 18 will at that instant be angularly spaced from circuit making engagement with roller 25 of switch 26 by a distance such that rotation of the gear for four seconds will move the point of spring-pressed dog 21 out of contact with the pin 38 and slide it clockwisely from the pin 38 at a point 40 toward the point coincident with the aperture marked "1" and the edge of dog 21 will reach this latter point after a travel of exactly four seconds and at the same time the stud 24 will engage and actuate the arm of the switch 26 to close the circuit therethrough. It will be clear also that although the switch 26 will be closed whenever the stud 24 sweeps by the roller 25 of the switch, depending for its timing upon the setting of the pin 38, it will be seen at once that the timed intervals may well be longer than can be selected from sixty seconds. This factor is availed of very simply by providing a "minutes" hand setting device comprising a spring-pressed arm 41 movable on a pivot 42 and including a pin 43 selectively positionable in any one of the sixty-one apertures in the annular series of apertures 44. The spring-pressed dog 31 of the minutes cam 28 sweeps the annular series of apertures of the minutes designation even though its rate of movement relative to that of the cam sweeping the "seconds" designated series of apertures, is one aperture for each complete movement of the seconds cam.

Assuming then a setting of the minutes pin, say, for example, at five, with the seconds pin set at four, a timed interval of five minutes and four seconds is manually set in the instrument. The mechanical setting is accomplished by reversing the motor 14 of the instrument and the respective cams 18 and 28 are driven clockwise (from the front of the instrument) until the respective spring-pressed shoes 21 and 31 engage at their forward ends and are stopped by the respective pins 38 and 43. Due to the friction drive when these points are reached, the cams stop regardless of the running of the motor. To secure such setting, it will be clear that from zero the minutes cam will have to make less than one complete revolution to advance the angular distance from zero to five. It will also be clear that it will only be necessary for the cam 18 to make a small relative rotation of less than one complete revolution to make enough relative angular progress to move from zero to the four seconds mark. This is very simple, as it is only necessary to realize that the datum position is that at which both studs 24 and 32 are engaging and actuating the respective snap switches, and there is only the one relative position of the cams carrying the studs at which both switches are closed regardless of the gear positions, as a new combination of individual teeth on the coupled gear may well happen to occupy the desired predetermined angular relations to the respective studs 24 and 32 so that the actual instantaneous gear relationship is inconsequential. As pointed out later in connection with the illustrative wiring system, the simultaneous closing of both is necessary to mark a completion of the timing stroke.

With the illustrative settings just established, and with the spring shoes in engagement with the respective pins, the timing cycle is begun by suitably actuating a control switch, to be described, which starts the running of the motor 14, or at least completes the driving relation between a continuously running motor and the gears 10 and 11. The cam-driving gears both are then driven in a counter-clockwise direction, (from the front) causing the shoes to leave the pins and move back toward the starting or datum points, or "1." When the seconds cam reaches its "1" position, the stud 24 engages and actuates the roller 25 closing the circuit through switch 26. However, as at this time the switch 34 remains open, nothing happens, so the circuit through switch 26 is immediately broken again as the stud 24 passes under and beyond the roller 25 and the drive of the gears in timed relation continues. As the cam 28 is frictionally driven by the gear 11 it moves with it so that in due course stud 32 engages roller 33 closing the circuit through the snap switch 34, but as at this time there is no circuit closed through switch 26, the stud continues on and passes under and beyond the roller 33.

In place of separate switches 26 and 34, it will be clear that a single circuit controlling agency can be provided which will respond only to the simultaneous attainment by both actuating studs of the cam at the datum point, as will be obvious.

As the respective spring pressed shoes only engage and stop against their respective appropriate pins in one direction of travel in setting the instrument by tripping its toe 45 thereon, as shown in Fig. 6, in all other cases, in securing timing intervals by working back to the datum or starting zero point, each shoe approaches its pin from the heel 46 instead of the toe thereof and the shoe simply rides over the pin without affecting the cam position or action.

It will be clear that the only essentials are the predetermination of the circuit closing stud 24 on the cam in its effective relationship to its selected or relatively or instantaneously selected tooth on gear 10 (due to the friction drive) and the analogous relationship of stud 32 on its cam in its effective relationship to its said instantaneously selected tooth. Therefore it will be clear that in making adjustments to establish or set a certain time interval, it makes no real difference whether the gears are adjusted relative to the cams, or to the studs thereof, or whether the stud is adjusted relative to the shoe disposition or vice versa, or whether the pin is adjusted as shown. Various combinations of adjustments might be resorted to with possible reduction in number of arcuate points of adjustments of any one unit, and with possibly an increased number of actual intervals of time being established. For instance, it will be clear that if desired, the pin 38 might be fixed while adjusting the spring-pressed shoe on the cam disc, or by moving the stud angularly to various positions about the periphery of the cam disc 18. Such changes are contemplated without interfering with the normal operation of the invention according to its fundamental method of operation.

Figure 4:
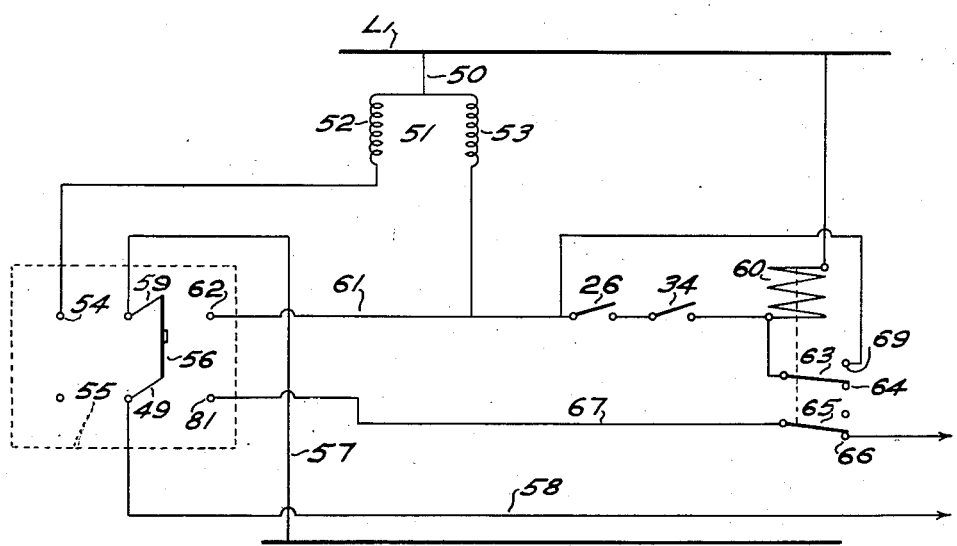
Fig. 4 represents a schematic wiring diagram of the system for the illustrative form of invention of the preceding figures.

In order to establish the electrical circuit as a timed function of the instrument, a simplified circuit is shown in Fig. 4. In this figure a power line L1 is connected by a common return line 50 to a reversible synchronous motor 51 having a reversing field 52 and a forward field 53. The reversible field 52 is connected to a terminal 54 of a reset and starting switch 55 having blade elements 49 and 59. The line to field 52 is open during forward running of the motor 51, but is energized and a circuit made therein when the switch blade element 59 of switch handle 56 is connected to line L2 by connector 57 is closed on terminal 54. The other blade or knife 49 of the switch is in constant circuit with one side or line of an independent load circuit, by a conductor 58. During the running of the motor 51 in reverse and after it has stopped by opening the switch blade 59 from contact 54, it will be observed that the lock-in relay 60 will be dropped out because the line from L2 through the relay will be broken, in one direction by the fact that timer-operated switches 26 and 34 are both open, and the common line 61 running to the relay and to forward field 53 of the motor 52 and shunting the timer-operated switches, at one end runs to open pole 69 and at the other terminates in terminal 62 in the switch. In this position also the upper relay switch member 63 rests upon a dead or inert pole 64 although the lower switch member 65 rests upon a live terminal 66 of the complemental line of the independent load circuit, and the switch end of connector 67 thereof runs to a switch terminal 81 which is not connected to a power line but is ready to establish the independent load circuit when switch blade 49 of switch 55 is closed thereon.

After the setting of the instrument for the desired time intervals, the switch handle 56 is closed to the left long enough to run the motor 51 in reverse for a period long enough to set the instrument. At this point the switch handle 56 is raised, opening the circuit through terminal 54 through field 52 and the motor stops. With everything in readiness and the timing adjustment made, the switch is moved to the right, until the switch blade 59 energized by line L2, closes a circuit through terminal 62 and line 61, through the forward field 53 of the motor which immediately starts the motor to run and drive the associated gears but without energizing relay 60. Simultaneously, the independent load circuit is closed by the contact of the switch blade 49 with terminal 81 completing a circuit through line 58, switch blade 49, terminal 81 and line 67, switch 65 and terminal 66, etc., to start a timed processing or recording step. As the cams rotate, the switches 26 and 34 will be alternately closed and opened, but each without affecting the relay circuit, until at the end of the predetermined time cycle, when both gears attain their datum angular relative position both switch 26 and switch 34 are energized simultaneously, which immediately closes a circuit from common line 61, through the relay 60 to power line L1. The coil being thus energized, the relay snaps in and simultaneously opens the external load circuit, by raising switch member 65 from contact 66, and also raises switch member 63 from its inert pole 64 into contact with the pole 69, closing another circuit through the relay and holding it in and marking the termination of the timed interval. The circuit thus described can be used for all timing ranges above a minimum of .1 second. To obtain timing ranges below .1 second, due to inertia of the relay described, it is necessary to utilize an electronic circuit. For this reason the circuit of Fig. 5 has been evolved.

Referring to Fig. 5, an electronic holding-in relay is disclosed which is effective for as small intervals as one cycle of sixty cycle A. C., or with the gear arrangement disclosed, of a range of from 1/60 second to one minute. The operation will be clear. In this case the normally made switches 26 and 34 disposed in parallel actuate the control grid of the gas filled pentode No. 2051 to prevent flow through the plate circuit. Interruption of either switch has no effect thereon as the other continues to complete the grid circuit. Interruption of both, however, interrupts the grid circuit and the plate circuit then flows energizing and maintaining the energization of the relay, marking the end of the timing interval.

It will be understood that although the primary purpose of the invention is to control a timed interval, which interval is predetermined, it will require but small changes to be able to use the system for the determination of an unknown time interval. To this end, one simple form is indicated in the fragmentary elevation of Fig. 7. In this case, as a purely illustrative manifestation, the front panel 13' is transparent and the annular series of apertures for an adjustable pin of both the "seconds" and "minutes" dial are replaced by a series of graduations as at 35'. A fixed stop pin is provided as at 40' over which the shoe 21 rides. Starting with the toe 45 of the shoe 21 against the stop pin as a datum in which the related teeth of the associated gears are at their datum, the unknown timing interval starts with proper running of the motor so as to wipe the shoes against the inner face of the panel 13' and over the stop pin 40'. When the circuit is broken through the motor, at the end of the unknown time period everything stops instantaneously, by any suitable means, and the shoes 21 and 31 will have acquired a certain relationship to the respective graduations 35', which is a function of the duration of the time interval, which is readily determined by the calibrations on the panel as viewed against the toes of the respective shoes.

The advantages of the invention are thought to be obvious.

Having thus described my invention, I claim:

1. A timer comprising a reversible synchronous motor, means for establishing an independent load circuit simultaneously with starting the said motor in one direction of running, means including two switch members for actuating a hold-in relay which is arranged to break the load circuit at the end of the timed interval when both of said switches are actuated simultaneously, means driven by said motor and pre-set for actuating the two switches simultaneously at the end of a timed interval and means responsive to running of the motor in the other direction of running for pre-setting the means driven by the motor for the start of said timed interval.

2. A timer comprising a reversible synchronous motor, means for establishing an independent load circuit simultaneously with starting the said motor in one direction of running, means including two switch members for actuating a hold-in relay which is arranged to break the load circuit at the end of the timed interval when both of said switches are actuated simultaneously, means driven by said motor for actuating the two switches simultaneously at the end of a timed interval, said means comprising two toothed gears, of which one has a predeterminedly greater number of teeth than the one other, and means responsive to running the motor in the other direction for angularly pre-setting the respective gears to establish in the first mentioned running the start of said timed interval which is ended by the simultaneous actuation of said switches.

3. A timer comprising a reversible synchronous motor, means for establishing an independent load circuit simultaneously with starting the said motor in one direction of running, means including two switch members for actuating a hold-in relay which is arranged to break the load circuit at the end of the timed interval when both of said switches are actuated simultaneously, means for actuating the two switches simultaneously at the end of a timed interval, said means comprising two toothed gears, of which one has a predeterminedly greater number of teeth than the one other, and in which the difference in numbers of teeth of the respective gears is one, means establishing a friction drive between the motor and gears, and means responsive to reversed running of said motor for pre-setting the timed interval by the angular position of the respective gears while the gears are each reversely driven not more than one complete rotation.

4. A timer comprising a pair of gears in effective mesh for rotation together, one of said gears having one tooth more than the other a reversible synchronous motor in effective driving relation with the gears, a pair of discs in frictional driven engagement respectively with the respective gears, two separate switch means, means establishing a circuit when both switch means are simultaneously actuated in the same sense, a hold-in relay in said circuit having a switch in a work circuit, means on the respective discs for actuating the respective switches when the discs are each in a predetermined angular position relative to their axes, means for selectively and predeterminedly stopping the discs in less than one complete reversed revolution of the gears upon reverse running of said motor to predetermine the angular starting point and therefore the duration of the timed interval terminating when both said switches are simultaneously actuated, and means for simultaneously starting the motor and the coupled gears and discs in relatively timed running and completing the work-circuit through the switch of said relay, said relay being responsive to the closing of the first mentioned circuit for actuating the relay switch for breaking the work-circuit to mark the termination of the timed interval.

5. A timer including a hold-in circuit, a pair of independently movable means for controlling the circuit when both means are in a predetermined relatively moved position, a first gear having teeth and arranged to move one of the pair of means as a function of angular position, a second gear having teeth in number one greater than the number of teeth of the first gear and arranged to move the other of said means as a function of angular position, a reversible electric motor for simultaneously driving both gears in both directions of running, and means for selectively closing a motor driving circuit through the motor in one direction to establish a starting relative position of the said gears relative to a datum position thereof and for establishing an opposite driving circuit through said motor to initiate the timing interval, said hold-in circuit including means automatically operative to interrupt said last mentioned driving circuit at the conclusion of the timing interval when the datum position of both gears has been attained.

WALTER LESLIE HUNT.

REFERENCES CITED

The following references are of record in the file of this patent:

UNITED STATES PATENTS

| Number | Name | Date |
|---|---|---|
| 1,863,658 | James | June 21, 1932 |
| 2,164,037 | Lockett | June 27, 1939 |
| 2,341,774 | Harris | Feb. 15, 1944 |

FOREIGN PATENTS

| Number | Country | Date |
|---|---|---|
| 196,116 | Germany | Feb. 27, 1908 |

OTHER REFERENCES

Hiscox: Mechanical Movements, Devices and Appliances, 17th edition, page 236, paragraph 921.